United States Patent [19]

Whitby et al.

[11] 4,349,732
[45] Sep. 14, 1982

[54] LASER SPATIAL STABILIZATION TRANSMISSION SYSTEM

[75] Inventors: Clyde M. Whitby, Duncanville, Tex.; Douglas L. White, deceased, late of Granada Hills, Calif., by Elizabeth A. White, administrator

[73] Assignee: The Singer Company, Binghamton, N.Y.

[21] Appl. No.: 110,070

[22] Filed: Jan. 7, 1980

[51] Int. Cl.³ .................................... G01J 1/20
[52] U.S. Cl. .................... 250/201; 250/203 R
[58] Field of Search ............... 250/201, 203, 204, 209; 455/609, 617; 369/44, 46, 45; 356/141, 152, 399, 400

[56] References Cited

U.S. PATENT DOCUMENTS

| | | | |
|---|---|---|---|
| 3,881,107 | 4/1975 | Bory | 250/234 |
| 4,117,319 | 9/1978 | White | 250/201 |
| 4,158,176 | 6/1979 | Hunt et al. | 331/94.5 T |
| 4,169,227 | 9/1979 | Malissin et al. | 250/201 |
| 4,279,472 | 7/1981 | Street | 250/201 |
| 4,280,215 | 7/1981 | Okano | 369/45 |

Primary Examiner—David C. Nelms
Attorney, Agent, or Firm—Jeff Rothenberg; Douglas M. Clarkson

[57] ABSTRACT

Method and apparatus for spatially stabilizing a projected beam of light, such as laser light. The beam is expanded prior to projection and then reduced and error corrected after reception.

3 Claims, 3 Drawing Figures

LASER SPATIAL STABILIZATION TRANSMISSION SYSTEM

BACKGROUND OF THE INVENTION

1. Technical Field

The present invention relates to optics, and more particularly relates to light beam transmission, especially laser beam transmission.

2. Background Art

Laser technology is steadily advancing and with each advance new problems are posed which demand still further advances. For example, a recent development in the field is the use of lasers in simulator model board type image generation systems.

Model board image generation systems have been employed for years in the simulator art. FIG. 1 shows the main elements of one such system for an aircraft simulator. A model board 10 comprising an extraordinarily detailed scale model of an extensive geographic area is mounted on one side, as shown. A gantry 12 is made to move back and forth on rails 14 while a frame 16 typically supports a camera which moves up and down and in and out on the gantry 12 thus providing the camera with full three-dimensional movement over the board 10. A small controllable mirror on the end of the camera provides attitudinal control over the camera viewing window.

More recently, and as shown in FIG. 1, a laser projector system has been developed to replace the camera. In this system a remote laser beam generator system 18 generates a beam 20 of "white" laser light made up of three or more monochromatic laser light components. This beam 20 is projected to a pair of mirrors 22, 24, which relay the beam 20 to a scanner mounted on the frame 16. The scanner scans the beam in the pattern of a TV raster onto the portion of the model board to be viewed, as depicted schematically by lines 26. A bank 28 of triads of photocells 30 having red, blue and green filters detect the light reflected off of the board 10 to thereby generate color video signals, all according to principles known in the art. The movement of the scanner about the board is controlled by a computer and associated drive circuitry, which might be located in cabinets 32, as shown, to coordinate the movement of the scanner with the computed movements of the aircraft being simulated. Video signals generated as described above are used in a video display system to provide the simulator operator with a realistic view as he would see from a real aircraft.

One major problem posed by the system just described is that of laser beam spatial stability. As the gantry 12 moves along the rails 14 and as the frame 16 moves on the gantry 12, vibrational motion is generated which is transmitted to the mirror 22, 24. The mirrors 22, 24, themselves warp with temperature change. Considering that a typical gantry must traverse across a lateral distance of some 60 feet, while the frame travels up and down through a range of some 24 feet, in and out excursion adding another 2 feet, even minor angular changes can cause serious lateral beam stability problems.

Accurate machining of gantry and frame moving parts and other refinements of the physical system can reduce these errors, but only to a point. Typical residual errors in a system such as described above are displacement errors of the order of one of five millimeters, and angular errors of the order of 0.05°. While this may appear fantastically small compared to the gross traveling distances described above, it is unacceptable for TV stability and resolution demands for simulator applications. For example, desired displacement tolerances at the scanner input are of the order of a quarter of a millimeter or less.

The present invention solves this problem and provides a laser or other light beam transmission system for projecting a light beam across large distances while maintaining a high degree of beam spatial stability.

DISCLOSURE OF INVENTION

According to the present invention there is presented a method and apparatus for expanding a beam of light to be projected, projecting the beam to the desired location, reducing the beam, and then employing correction devices to detect angular deviation errors in the reduced beam and correct them.

BRIEF DESCRIPTION OF THE DRAWINGS

FIG. 1 shows a partial view of a modelboard image generation system; while

BEST MODE OF CARRYING OUT THE INVENTION

Figure 1:
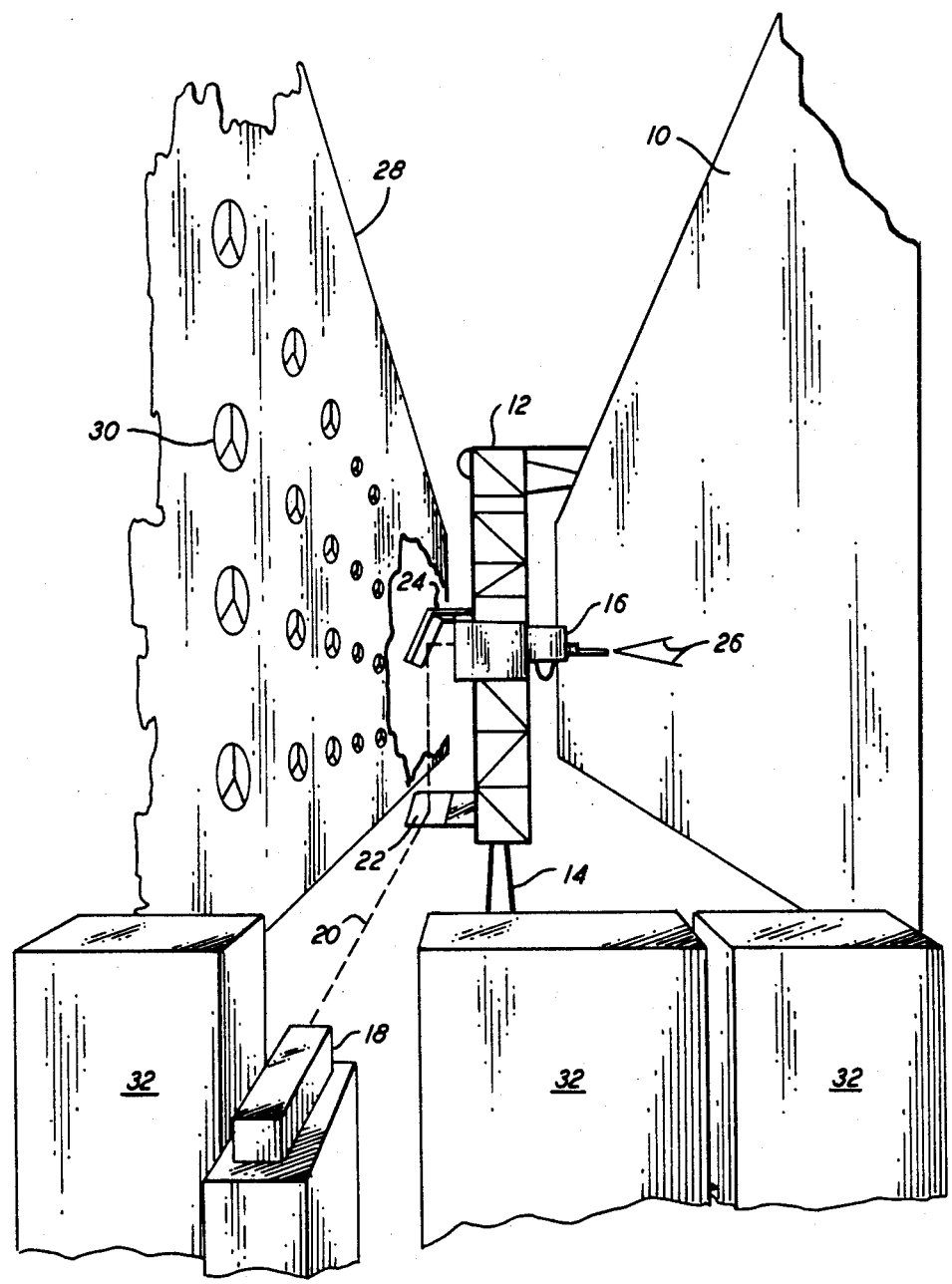
Figures 2, 3:
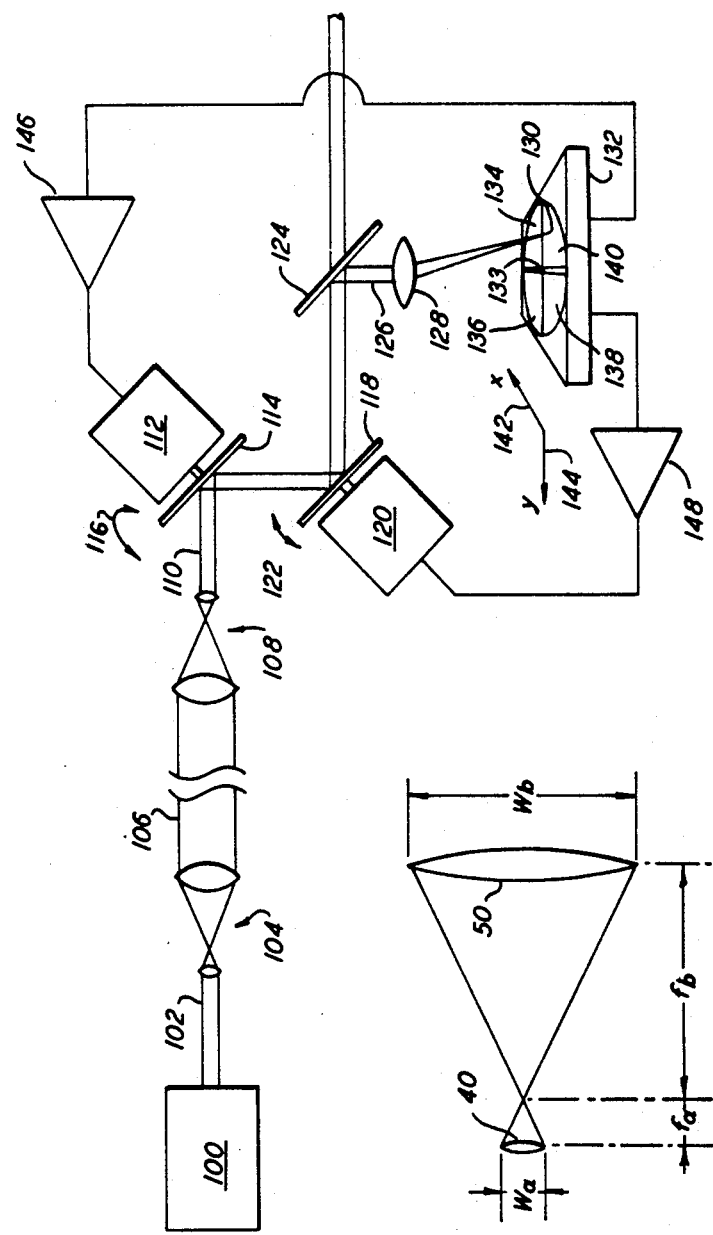
FIG. 2 illustrates the principles of beam expansion and reduction employed in the present invention.
FIG. 3 is a schematic diagram of the preferred embodiment of the present invention.

FIG. 2 illustrates a principle of light beam manipulation utilized in the present invention, that is, beam reduction and expansion. At least two lenses are involved in the technique, each having a different focal length. FIG. 2 shows a first lens 40 having a focal length of $f_a$ and a second lens 50 having a focal length of $f_b$. They are coaxially arranged with a separation distance equal to $f_a + f_b$. According to the principles of the present invention, a light beam of width $W_a$ entering lens 40 from the left will be expanded and will leave lens 50 to the right as an expanded beam having a width $W_b$, as shown. The reverse is true as well, i.e., a beam having a width of $W_b$ entering lens 50 from the right will be reduced and will leave 40 the left as a reduced beam having a width $W_a$. In both cases the following relationship governs the amount of reduction or expansion involved:

$$f_a/f_b = W_a/W_b.$$

Turning now to FIG. 3, there is shown a schematic diagram of the preferred embodiment of the present invention. A laser generator 100, constructed according to known principles, produces a beam of laser light 102 which is to be projected across some relatively long distance. Typical beam widths for such laser generators as are employed in model board image generation systems are of the order of 1.5 millimeters.

This beam 102 is directed to a beam expander 104 constructed according to the above-described principles wherein $f_a/f_b = 0.03$. This produces an expanded beam 106 having a width of 50 millimeters which is then projected to a desired location where it is reduced in a beam reducer 108 constructed according to the above-described principles wherein $f_a/f_b$ equals 20. The reduced beam 110 thus has a width of 2.5 millimeters.

The above-described process of expanding/projecting/reducing provides several benefits over projecting the unprocessed laser beam. The primary benefit is that spatial deviation errors which accrue in the projection process are reduced in proportion to the amount of beam reduction. Applying this to the errors inherent in a typical model board image generation projection environment, typical spatial deviations range from 1.1 to 4.2 millimeters at the scanner input, which are unacceptable. The above scheme reduces these errors to 0.06 to 0.21 millimeters which are acceptable.

Another benefit produced by the above scheme is to reduce the amount of light power lost to atmospheric and mirror surface scattering. And finally, by projecting a light beam having a diminished energy density the safety of such a system is correspondingly increased.

The particular expansion and reduction factors disclosed above were selected on the basis of optical limitations of the lenses employed as well as physical constraints imposed by the physical environment. Clearly, the application of these and other selection considerations is well within the purview of the skilled artisan, once the principles of operation of the present invention are understood. For example, the designer of such system for a "white" laser beam such as mentioned above may wish to utilize a separate beam expander with each component laser to, for example, match beam divergences and expansion factors for each laser before combining the beams in order to produce an optimally balanced beam. These considerations are all well within the scope of the art.

After reduction, beam 110 must be further processed in accordance with the principles of the present invention. It is found that as lateral spatial deviation is proportionately reduced by the beam reduction, so are angular errors proportionately increased. Thus, while lateral spatial errors were reduced from the approximately 4.2 millimeters to 0.21 millimeters, the accrued angular deviations which, as described above, are of the order of 0.05° in such a system, are magnified to approximately 1° which is unacceptably large for applications such as those hereinbefore described.

Therefore, a beam angular error correction scheme is implemented according to the principles of the present invention. In accordance therewith, the reduced beam 110 is projected to the first of two optical type galvanometers. This first optical galvanometer 112 is a device which causes rotation in an associated mirror 114, shown here in edgewise view, in response to an applied electrical signal. First galvanometer 112 rotates mirror 114 about an axis which lies at the intersection of the plane of the drawing with the plane of the mirror 114, as depicted by arrows 116. Such galvanometer devices are well known in the art and are commercially available from, for example, General Scanning Incorporated of Watertown, Mass. 02172.

First galvanometer 112 is positioned so that the plane of its associated mirror 114 is oriented, at galvanometer midpoint, at an angle of 45° to reduced beam 110. Beam 110 is thus reflected at mirror 114 at an angle of 90°, as shown, to the mirror 118 of a second galvanometer 120, which mirror is likewise shown here in edgewise view. This second mirror 118 is caused to rotate about an axis which lies perpendicular to the plane of the drawing, as depicted by arrows 122. It is oriented, at galvanometer midpoint, at an angle of 45° to the reflected beam from the first mirror 114 causing the beam to be reflected at an angle of 90°, as shown.

The twice-reflected beam is projected to a beamsplitter 124 oriented at 45° thereto which splits off a small portion 126 of the beam and reflects it to a focus lens 128 which focuses the beam to a point 130 on a lateral effect quadrant photodetector 132 of known construction. This device 132 converts light incident thereon into two electrical signals such that their magnitude varies in relation to the relative deviation of that light in two perpendicular directions from a central reference point 133.

The device depicted in FIG. 3 is shown with is four quadrant 134–140 oriented such that, assuming the view is a side view, sideways beam deviations will cause the point 130 to travel in the direction indicated by x-axis 142. In other words, if beam 110 were off-angle by some amount out of the plane of the drawing toward the viewer, point 130 will tend to be in either quadrant 138 or 140, while if away from the viewer in 134 or 136. If the beam 110 possesses an angular deviation error upwards, the point 130 will tend to be in either quadrant 136 or 138, while if downward 134 or 140. Y axis 144 shows the direction in which point 130 will travel when deflected vertically. FIG. 3 shows the focus point 130 in quadrant 140 which indicates angular deviation error in both the negative X and negative Y directions, i.e., both downward and toward the observer. Thus, quadrant photodetector will produce output signals responding to X and Y lateral angular beam deviations. The X signal is fed to an amplifier 146 which amplifies the signal before feeding it to the first galvanometer 112. The Y signal is fed to a second amplifier 148 which likewise amplifies the signal before feeding it to the second galvanometer 120.

The first galvanometer/mirror combination 112/114 tends to correct X axis (sideways) angular deviations in response to the signal from amplifier 146 in the manner of a servo which principles are well known. Galvanometer/mirror combination 120/118 likewise corrects for Y axis (vertical) angular deviations in the manner of a servo. The net result is to reduce angular deviations to nearly immeasureable amounts, limited by galvanometer responsiveness, quadrant photodetector sensitivity, and servo loop gain.

Thus has been described the preferred embodiment of the present invention, as well as several suggested modifications thereto. The foregoing and other modifications to the present invention will be readily understood by those of the skill in the art to which the invention pertains and can be made without departing from the spirit and scope of the invention as defined more particularly in the following claims.

We claim:

1. In a light beam transmission system, an improvement for reducing translational and angular beam deviation errors, comprising:
    (a) expansion means disposed near the beginning of the path of light beam transmission, for increasing the cross sectional area of the light beam to produce an expanded beam;
    (b) said expansion means including a first lens having at least one convex surface and a first predetermined focal length, $f_1$, disposed in the path of the light beam and coaxial therewith, a second lens having at least one convex surface and a second predetermined focal length, $f_2$, disposed in the path of the light beam, downstream of said first lens, coaxial therewith, and at a distance therefrom substantially equal to the sum of $f_1$ and $f_2$, wherein the amount by which the light beam is expanded is substantially equal to the ratio $f_2/f_1$, a third lens having at least one convex surface and a third predetermined focal length, $f_3$, disposed in the path of said expanded light beam and coaxial therewith, and a fourth lens having at least one convex surface and a fourth predetermined focal length, $f_4$, disposed in the path of the light beam, downstream of said third lens, coaxial therewith, and at a distance therefrom substantially equal to the sum of $f_3$ and $f_4$, wherein the amount by which the light beam is reduced is substantially equal to the ratio $f_3/f_4$;

(c) reduction means disposed near the end of the path of light beam transmission for decreasing the cross sectional area of the beam to produce a reduced beam;

(d) correction means, disposed in the path of said reduced beam, for reducing angular deflection of said reduced beam from a desired reduced beam transmission axis;

(e) said correction means including detection means for detecting the deviation of said reduced beam from said desired transmission axis and producing an output signal representative thereof, and deflection means responsive to said detection means for deflecting said reduced beam in accordance with said output signal by an amount which substantially aligns it with said desired transmission axis;

(f) said detection including beam splitting means for splitting said reduced beam into two parts, a first and a second, and for directing said two parts in two different directions having a substantially fixed space relation;

(g) a lateral effect quadrant photodetector in the path of said second part of said reduced beam for detecting its position relative to a predetermined desired position and providing said output signal representative of said detected position;

(h) focus means for focusing said second part of said reduced beam onto said lateral effect quadrant photodetector; and (i) amplifier means for amplifying said output signal to thereby improve said deflection correction.

2. In a light beam transmission system, a method for reducing translational and angular deviation errors in a beam to be projected across a given distance, comprising the steps of:

(a) expanding said beam by optically increasing its cross sectional area to produce a resultant expanded beam;

(b) projecting said expanded beam across said given distance; then (c) reducing said expanded beam by optically decreasing the cross sectional area of said beam to produce a resultant reduced beam; and (d) correcting said reduced beam for angular deviation errors.

3. The method of claim 2 wherein said step of correcting comprises the steps of:

(a) splitting off a portion of said reduced beam by means of an optical splitter;

(b) focussing said split off portion onto a lateral deviation photodetector to thereby generate lateral angular deviation error signals; and (c) driving galvanometer controlled mirrors disposed in the path of said reduced beam, positioned upstream of said splitter, in response to said lateral deviation error signals so as to reduce angular errors detected by said photodetector.

* * * * *